United States Patent [19]
Feuillet

[11] Patent Number: 5,820,216
[45] Date of Patent: Oct. 13, 1998

[54] SLIDE FOR A VEHICLE SEAT, AND A SEAT PROVIDED WITH SUCH A SLIDE

[75] Inventor: Patrick Feuillet, Saint Georges les Groseillers, France

[73] Assignee: Bertrand Faure Equipements SA, Boulogne, France

[21] Appl. No.: 823,370

[22] Filed: Mar. 24, 1997

[30] Foreign Application Priority Data

Mar. 25, 1996 [FR] France .................................. 96 03686

[51] Int. Cl.$^6$ .............................. A47C 1/026; B60N 2/12
[52] U.S. Cl. ........................ 297/341; 297/344.1; 248/430
[58] Field of Search ................................ 297/341, 344.1; 248/430

[56] References Cited

U.S. PATENT DOCUMENTS

| 1,684,944 | 9/1928 | Chapman . | |
|---|---|---|---|
| 4,301,988 | 11/1981 | Parizet | 248/430 |
| 4,449,752 | 5/1984 | Yasumatsu et al. | 297/341 |
| 4,621,867 | 11/1986 | Perring et al. | 297/341 |
| 4,666,208 | 5/1987 | Tatematsu et al. | 297/341 |
| 4,881,774 | 11/1989 | Bradley et al. | 297/341 |
| 4,949,932 | 8/1990 | Terai | 248/430 |
| 5,137,331 | 8/1992 | Colozza | 297/341 |
| 5,352,019 | 10/1994 | Bauer et al. | 297/341 |
| 5,520,362 | 5/1996 | Gerlach | 248/430 X |
| 5,605,377 | 2/1997 | Tame | 297/341 |
| 5,626,392 | 5/1997 | Bauer et al. | 297/341 |
| 5,688,026 | 11/1997 | Reubeuze et al. | 297/341 |

FOREIGN PATENT DOCUMENTS 2 686 383   7/1993   France .

OTHER PUBLICATIONS

French Search Report, Appl. No. FR 9603686, dated Jan. 15, 1997.

Primary Examiner—Peter M. Cuomo
Assistant Examiner—Rodney B. White
Attorney, Agent, or Firm—Marshall, O'Toole, Gerstein, Murray & Borun

[57] ABSTRACT

A slide for a vehicle seat, the slide comprising a fixed rail, a moving rail which can be secured to the fixed rail by a latch resiliently urged toward its locked position, and a cam mounted on the moving rail and suitable for being placed in an active position in which it holds the latch in its unlocked position. The cam is secured to an actuating finger which, when said cam is in its active position, co-operates with a resilient blade mounted on the fixed rail and suitable for retracting out of the way of the actuating finger while the moving rail is being displaced forwards, but stopping the actuating finger while the moving rail is being displaced backwards.

6 Claims, 2 Drawing Sheets

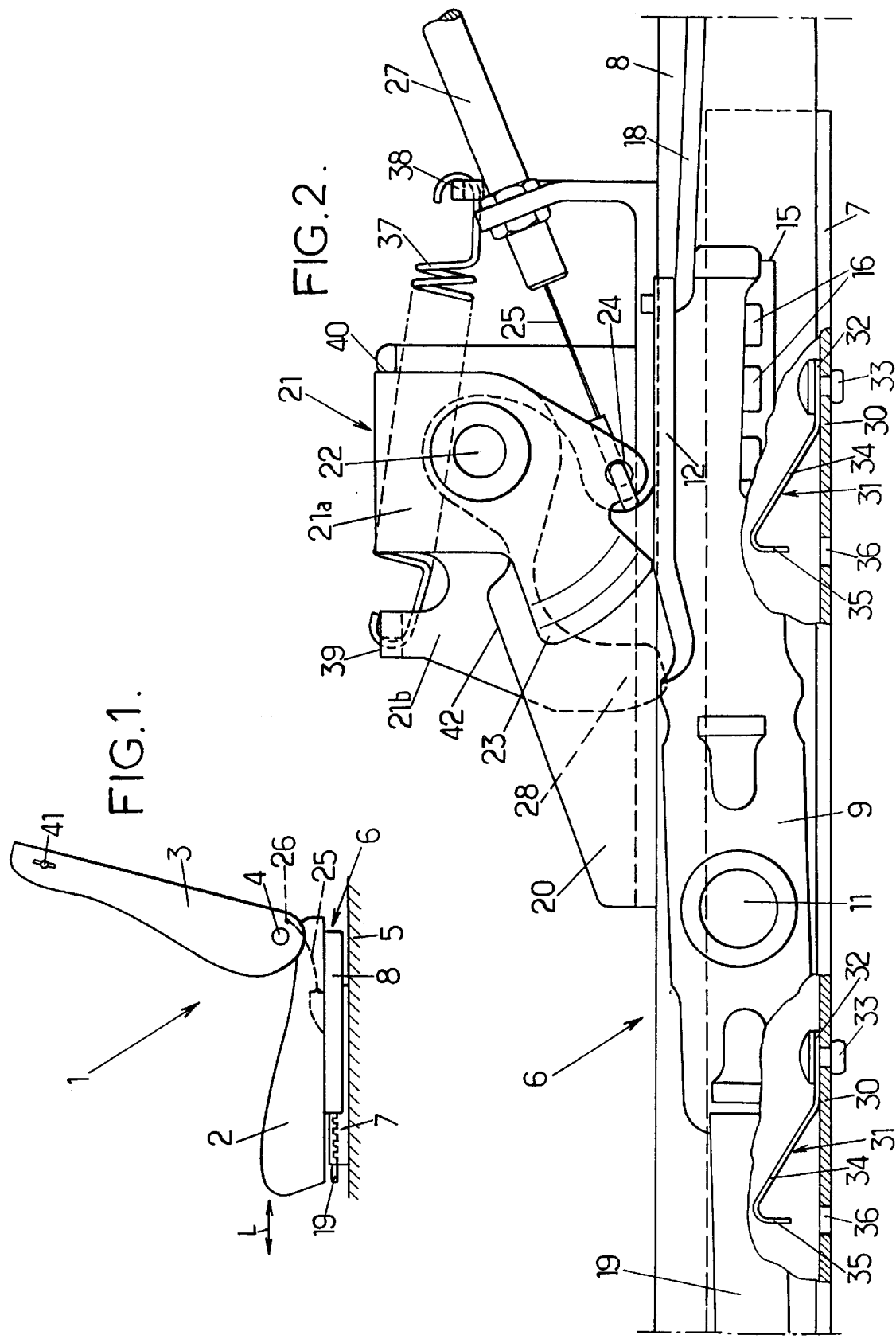

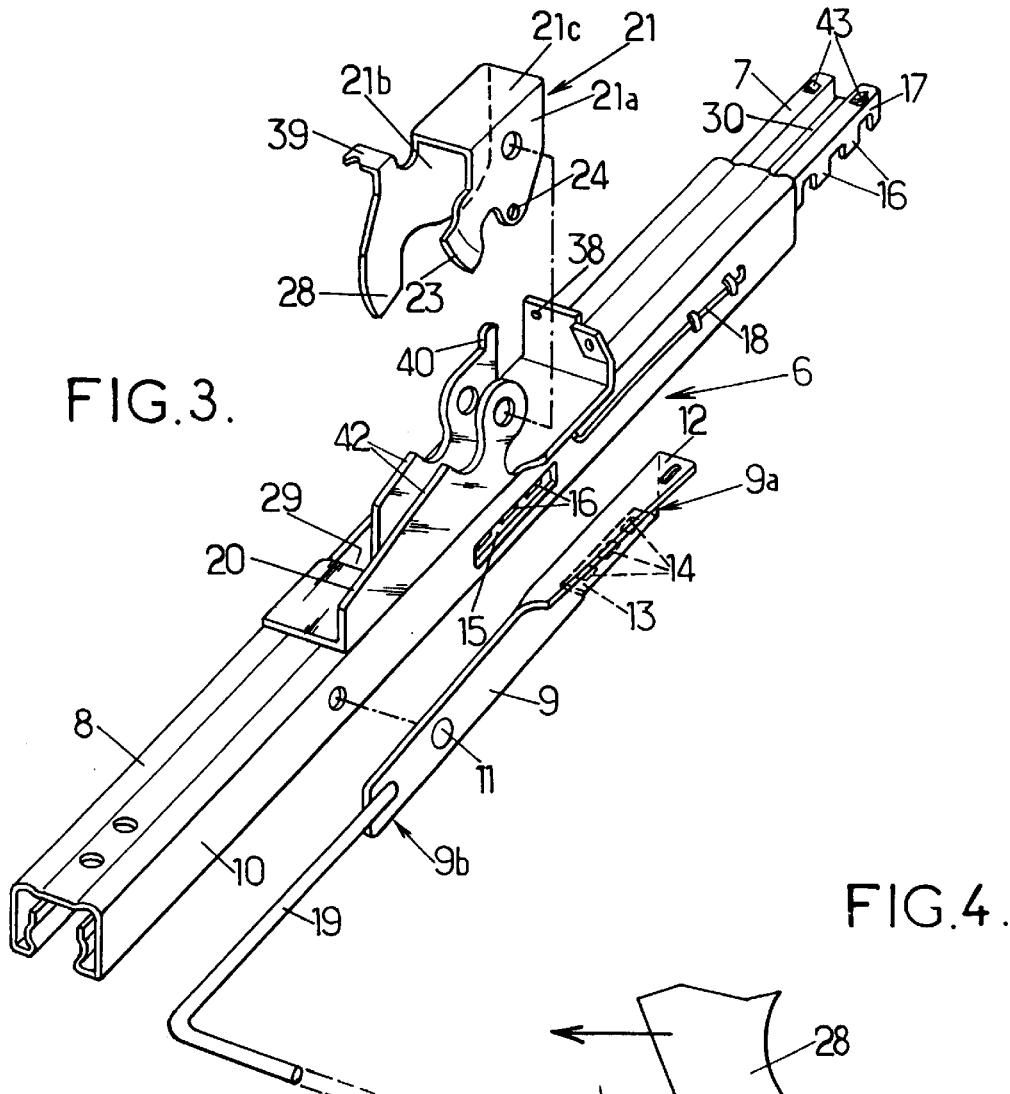
FIG.3.
FIG.4.
FIG.5.
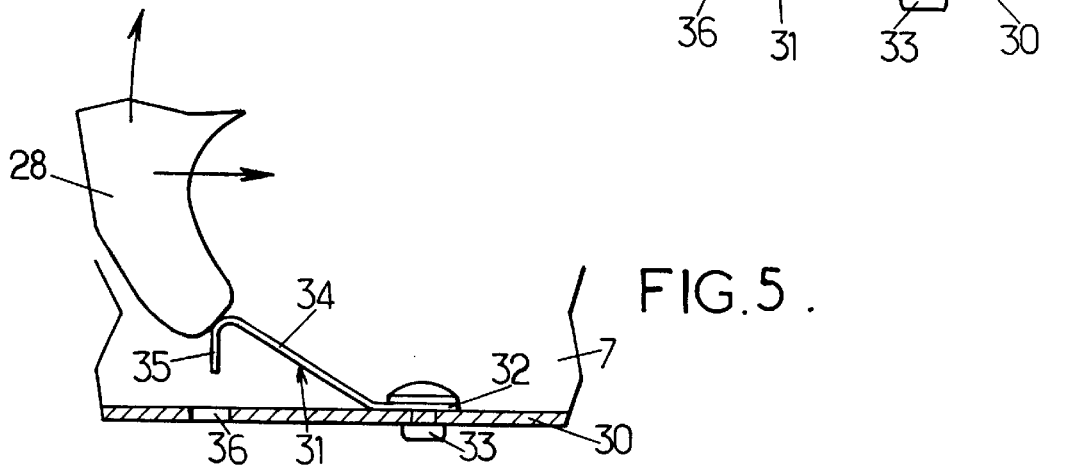

SLIDE FOR A VEHICLE SEAT, AND A SEAT PROVIDED WITH SUCH A SLIDE

FIELD OF THE INVENTION

The present invention relates to slides for vehicle seats, and to seats provided with such slides.

Among the slides in question, the invention relates more particularly to those which are designed to support a seat proper, it being possible to adjust the longitudinal position of the seat proper to suit a user, and to displace it rapidly forwards to provide access to a space situated behind the seat, and then backwards to a position in which it can be used.

Such slides are used in particular to support front seats in two-door motor vehicles, such front seats being slid forwards to offer unobstructed access to the back seats of the vehicle.

In order to provide access to the back seats, it must be possible to unlock such slides so as to enable the front seat to be slid rapidly forwards, and they must then re-lock automatically when the front seat is slid backwards.

BACKGROUND OF THE INVENTION

Such a slide is known that comprises:

a "fixed" first rail designed to be secured to the vehicle;

a "moving" second rail designed to support a seat proper, the moving rail being disposed parallel to the fixed rail and being mounted to slide along said fixed rail in a direction referred to as "longitudinal";

a latch mounted on the moving rail, the latch being displaceable between firstly a locked position in which it co-operates with the fixed rail to prevent the two rails from moving relative to each other, and secondly an unlocked position in which it no longer co-operates with the fixed rail and enables the moving rail to slide relative to the fixed rail;

a latch spring urging the latch towards its locked position;

means for displacing the latch from its locked position to its unlocked position;

a cam mounted to rotate on the moving rail between two stable angular positions, namely firstly an active position in which the cam acts on the latch to hold it in its unlocked position, and secondly a rest position in which the cam does not co-operate with the latch, the cam also having a "neutral" angular position between the two abutment positions, and said cam further being secured to a rigid actuating finger;

means for displacing the cam from its rest position to its active position;

a cam spring urging the cam towards its active position when said cam is in an angular position between its neutral position and its active position, and urging the cam towards its rest position when said cam is in an angular position between its neutral position and its rest position; and at least one abutment member which is mounted on the fixed rail and which does not interfere with the actuating finger when the cam is in the rest position, the abutment member being suitable for co-operating with said actuating finger so as to retract out of the way of the actuating finger while the moving rail is being displaced forwards with the cam in the active position, and so as to constitute a fixed abutment relative to the actuating finger while the moving rail is being displaced backwards with the cam in the active position, the abutment member and the actuating finger being designed so that the actuating finger then causes the cam to pivot from its active position to beyond its neutral position, so that said cam is then returned to its rest position by the cam spring, thereby enabling the latch to return to its locked position under drive from the latch spring, the slide being designed so that, once the cam is placed in its active position, said cam remains in said active position so long as the actuating finger does not cause it to pivot.

Thus, the abutment member and the actuating finger guarantee that, after the front seat has been moved forwards to gain access to the back seats of the vehicle, and when the front seat is then moved back again, the slide re-locks as soon as the front seat reaches a predetermined fixed position.

In such a known slide, the abutment member is constituted by a relatively complex and costly mechanism which comprises a metal support mounted on the fixed rail, a horizontal metal pin fixed to said support, a connection rod mounted to pivot on said pin and urged towards a rest position by a return spring, the connection rod being provided with a sloping surface suitable for retracting out of the way of the cam actuating finger while the moving rail is being displaced forwards with the cam in its active position, and said connection rod is further provided with an abutment face which stops the actuating finger while the moving rail is being displaced backwards with the cam in its active position.

OBJECTS AND SUMMARY OF THE INVENTION

A particular object of the present invention is to provide a slide of the type in question which has an abutment member that is simpler and cheaper.

To this end, the invention provides a slide of the type in question wherein the abutment member is constituted by a resilient metal blade which extends substantially in said longitudinal direction between firstly a fixed end secured to the fixed rail and secondly a free end that can be displaced vertically, the resilient blade having a rising portion which extends sloping upwards and forwards starting from its fixed end, the actuating finger pressing against said rising portion so as to cause it to bend resiliently downwards while the moving rail is being displaced forwards with the cam in its active position, and the resilient blade further having a stop portion in the vicinity of its free end, which stop portion forms the above-mentioned fixed abutment for the actuating finger while moving rail is being displaced backwards with the cam in its active position.

In preferred embodiments, one or more of the following provisions are used:

the rising portion of the resilient cam is extended forwards by a falling portion which constitutes said stop portion;

the fixed rail includes a horizontal web on which the fixed end of the resilient blade is mounted; and the backward sliding stroke of the moving rail is limited by a back abutment position, the fixed rail being provided with first and second resilient blades, the first resilient blade being disposed so as to co-operate with the actuating finger when the moving rail is in its back abutment position so as then to cause the cam to pivot into its rest position, and the second resilient blade being disposed in front of the first resilient blade, in a position corresponding to a mean slide setting.

The invention also provides a vehicle seat comprising a seat back and a seat proper mounted to slide longitudinally by means of at least one slide as defined above, the seat proper being fixed to the moving rail of the slide.

Advantageously, the means for displacing the cam from its rest position to its active position comprise a fastening point fixed to a cable that connects said cam to the seat back, the cable being mounted so as to displace the cam into its active position when the seat back is tilted down forwards.

BRIEF DESCRIPTION OF THE DRAWINGS

Other characteristics and advantages of the invention appear from the following detailed description of one of its embodiments given by way of non-limiting example and with reference to the accompanying drawings, in which:

FIG. 1 is diagrammatic view of a vehicle seat provided with slides of the invention;

FIG. 2 is a partially cut-away detail view of one of the slides of the seat shown in FIG. 1;

FIG. 3 is an exploded view of the slide shown in FIG. 2;

FIG 4 and 5 are detail views showing how resilient blades operate that are mounted in the slides shown in FIGS. 2 and 3.

MORE DETAILED DESCRIPTION

In the various figures, the same references are used to designate elements that are identical or similar.

As shown diagrammatically in FIG. 1, the invention is applicable to a vehicle seat 1, in particular a front seat of a two-door motor vehicle, i.e. a vehicle in which it is necessary to displace at least one of the front seats to gain access to the back seat.

The seat 1 comprises a seat proper 2 and a seat back 3 which is mounted on the seat proper 2 to tilt about a horizontal transverse axis 4.

The seat proper 2 is mounted on the floor 5 of the vehicle by means of two juxtaposed slides 6 (only one of which can be seen in FIG. 1) so as to enable the seat proper 2 to be moved in translation in a longitudinal direction L forwards or backwards.

Each of the slides 6 includes firstly a substantially channel-section fixed metal rail 7 which is secured to the floor 5 of the vehicle, and secondly a moving metal rail 8 on which the seat proper 2 of the seat is mounted, it being possible for the moving rail to slide along the fixed rail between a front abutment position and a back abutment position.

At least one of the two slides 6 (and preferably both slides 6) further includes a latch 9 which is shown in more detail in FIGS. 2 and 3.

The latch 9 is a metal lever that is disposed on the outside of the moving rail 8, and that is mounted on a side wall 10 of said moving rail so as to be pivotable about a horizontal transverse axis 11.

The latch 9 extends longitudinally between first and second ends 9a and 9b which are disposed on either side of the axis 11.

The first end 9a of the latch has firstly a top horizontal flange 12 which extends away from the slide 6 and whose purpose is explained below, and secondly a bottom horizontal flange 13 which penetrates with a certain amount of vertical clearance into the moving rail 8, via a window 15 provided through the side wall 10 of said moving rail.

The bottom flange 13 of the latch is provided with a plurality of holes 14 which are disposed in register with downwardly pointing teeth 16 formed on the bottom edge of a side lip 17 belonging to the fixed rail 7.

Furthermore, the first end 9a of the latch is urged upwards by a resilient metal wire 18 fixed to the side wall 10 of the moving rail, so as to place the latch in a locked position in which the teeth 16 on the fixed rail are engaged in the holes 14 in the bottom flange 13 of the latch, thereby preventing the moving rail 8 from moving relative to the fixed rail 7.

The second end 9b of the latch is provided with an actuating member 19 which may in particular be in the form of a rigid rod extending forwards and preferably (but not necessarily) connected to a second latch 9 mounted on the second slide 6 of the seat to enable both latches to be actuated simultaneously.

The front end of the actuating member 19 may be pulled upwards by a user of the seat so as to cause the latch 9 to pivot so that the first end 9a of the latch is lowered until the latch reaches an unlocked position in which the holes 14 in the bottom horizontal flange 13 of said latch do not interfere with the teeth 16 on the fixed rail.

The user of the seat 1 can thus adjust the longitudinal position of the seat at will.

Furthermore, the moving rail 8 is secured to a metal support part 20 which carries a control member 21 that is also made of metal, and that is mounted on the support part 20 to pivot about a transverse horizontal axis 22.

The control member 21 is a substantially channel section member and it has two side flanges 21a and 21b extending downwards from an interconnecting top wall 21c.

The first flange 21a of the control member extends downwards to a cam 23 that has an outline in the form of a circular arc centered on the axis 22 and that is disposed above the top flange 12 of the latch so that it can press against said top flange.

In addition, the first flange 21a of the control member, also includes a fastening point 24 which is fixed to one end of a metal cable 25 which is mounted to slide in a sheath 27 itself fixed to the support part 20 at one of its ends.

The other end of the cable is fixed to the back 3 of the seat at a fixing point 26 (FIG. 1) which is disposed such that tilting down the seat back 3 forwards causes traction to be exerted on the cable 25.

The second flange 21b of the control member 21 is provided with an actuating finger 28 curved downwards and backwards and disposed in register with an orifice 29 provided through the top of the moving rail 8, so that said actuating finger can penetrate into the slide 6 down to the vicinity of the web 30 of the fixed rail 7.

Furthermore, at least one resilient metal blade 31, and preferably two blades 31, are fixed to the web 30 of the fixed rail so as to interfere with the actuating finger 28 when said finger is placed in the vicinity of said web 30.

Each of the resilient blades has a horizontal back end 32 which is fixed to the web 30 of the fixed rail, e.g. by means of a rivet 33.

Starting from its back end 32, the resilient blade 31 firstly has a rising portion 34 extending forwards and upwards to a front end constituted by a stop portion 35 folded downwards. The rising portion 34 of each blade 31 preferably forms an angle of less than 45 degrees with the web 30.

The stop portion 35 can be displaced vertically by bending the rising portion 34, the web 30 of the fixed rail preferably being provided with an orifice 36 facing the stop portion 35 so that said web 30 does not interfere with said stop portion while the rising portion 34 is bending.

A helical traction spring 37 is tensioned between two fastening points 38 and 39 belonging respectively to the support part 20 and to the second flange 21b of the control member, and situated respectively behind and in front of the axis 22.

In addition, the direction of alignment of the fastening points 38 and 39 normally passes above the axis 22, so that the spring 37 then holds the control member 21 in a rest position in which the top wall 21c of said control member bears against a back abutment 40 belonging to the support part 20.

When the control member 21 is in its rest position, the cam 23 does not interfere with the latch 9, and the actuating finger 28 penetrates only slightly into the slide 6, without interfering with the resilient metal blades 31.

When a user of the vehicle wishes to gain access to the back seats, the user tilts down the seat back 3 forwards, e.g. by releasing the seat back 3 by means of a handle or knob 41 (FIG. 1), and this tilting-down movement causes traction to be exerted on the cable 25.

The cable 25 then causes the control member 21 to pivot, thereby displacing the cam 23 and the actuating finger 28 downwards, the cable 25 thus entraining the control member 21 at least to beyond a neutral position in which the straight line joining the fastening points 38 and 39 of the spring 37 intersects the axis 22.

Thus, the spring 37 places and holds the control member 21 in an "active" position in which the top wall 21c of the control member bears against a front abutment 42 belonging to the support part 20.

In this active position, the cam 23 bears against the top flange 12 of the latch, thereby placing the latch in its unlocked position, and the actuating finger 28 is situated in the vicinity of the web 30 of the fixed rail.

The user can then push the seat proper 2 forwards as far as possible so as to offer unobstructed access to the back seats.

During this movement, the actuating finger 28 might encounter one or more resilient blades 31, as shown in FIG. 4.

In which case, the actuating finger 28 presses on the rising portions 34 of the resilient blades, thereby causing said rising portions to bend downwards, so that said resilient blades 31 are retracted under and out of the way of the actuating finger 28 and do not prevent the seat proper from being displaced forwards.

When the seat 1 is to be put back in the position in which it is to be used, the seat back 3 is tilted up, and the seat 1 as a whole is pulled backwards.

During this movement, as soon as the actuating finger 28 encounters a stop portion 35 of a resilient blade 31, as shown in FIG. 5, the resilient metal blade stops the finger 28 by chocking it so as cause the actuating finger 28 to pivot upwards until the control member 21 has gone past its neutral position.

The spring 27 then returns the control member 21 to its rest position, and the resilient metal wire 18 returns the latch 9 to its locked position, so that the seat proper 2 is once again prevented from moving relative to the floor 5 of the vehicle.

Preferably, the slide 6 is provided with two resilient blades 31, one of the blades being disposed so that the seat proper 2 is re-locked in a mean position corresponding to a longitudinal setting that is acceptable for most users of the seat, and the other blade being disposed in the vicinity of the back of the fixed rail 7. The back-most resilient blade 31 is organized to cause the control member 21 to return to its rest position and to cause the latch 9 to be locked when the seat proper 2 is displaced into its back abutment position, as defined by abutments 43 which are formed at the back end of the fixed rail 7 and which co-operate with corresponding portions (not shown) that can be displaced with the moving rail 8.

The back-most resilient blade 31 is useful when the seat back 3 has been tilted down forwards without displacing the seat proper 2 forwards, or with the seat proper 2 having been displaced over a distance that is too short for the actuating finger 28 to have gone past the front-most resilient blade 31.

In which case, when the user tilts up the seat back 3, the applied traction force unavoidably brings the seat proper 2 into back abutment, in which the back-most resilient blade 31 locks the slide 6: this resilient blade thus guarantees that the slide is re-locked under all circumstances.

I claim:

1. A slide for a vehicle seat, the slide comprising:

a fixed first rail designed to be secured to the vehicle;

a moving second rail designed to support a seat proper, the moving rail being disposed parallel to the fixed rail and being mounted to slide along said fixed rail in a longitudinal forwards and backwards direction;

a latch mounted on the moving rail, the latch being displaceable between a first locked position in which it co-operates with the fixed rail to prevent the two rails from moving relative to each other, and a second unlocked position in which it no longer co-operates with the fixed rail and enables the moving rail to slide relative to the fixed rail;

a latch spring urging the latch toward its locked position;

means for displacing the latch from its locked position to its unlocked position;

a cam mounted to rotate on the moving rail between two stable angular positions, namely a first active position in which the cam acts on the latch to hold it in its unlocked position, and a second rest position in which the cam does not co-operate with the latch, the cam also having a neutral angular position between said two positions, and said cam further being secured to a rigid actuating finger;

means for displacing the cam from its rest position to its active position;

a cam spring urging the cam towards its active position when said cam is in an angular position between its neutral position and its active position, and urging the cam towards its rest position when said cam is in an angular position between its neutral position and its rest position; and at least one abutment member which is mounted on the fixed rail and which does not interfere with the actuating finger when the cam is in the rest position, the abutment member being suitable for co-operating with said actuating finger so as to retract out of the way of the actuating finger while the moving rail is being displaced forwards with the cam in the active position, and so as to constitute a fixed abutment relative to the actuating finger while the moving rail is being displaced backwards with the cam in the active position, the abutment member and the actuating finger being designed so that the actuating finger then causes the cam to pivot from its active position to beyond its neutral position, so that said cam is then returned to its rest position by the cam spring, thereby enabling the latch to return to its locked position under drive from the latch spring, the slide being designed so that, once the cam is placed in its active position, said cam remains in said active position so long as the actuating finger does not cause it to pivot;

wherein the abutment member is constituted by a resilient metal blade which extends substantially in said longitudinal direction between a first fixed end secured to the fixed rail and a second free end that can be displaced vertically, the resilient blade having a rising portion which extends sloping upwards and forwards starting from its fixed end, the actuating finger pressing against said rising portion so as to cause it to bend resiliently downwards while the moving rail is being displaced forwards with the cam in its active position, and the resilient blade further having a stop portion close to its free end, wherein the stop portion forms said fixed abutment for the actuating finger while the moving rail is being displaced backwards with the cam in its active position.

2. A slide according to claim 1, in which the rising portion of the resilient blade is extended forwards by a falling portion which constitutes said stop portion.

3. A slide according to claim 1, in which the fixed rail includes a horizontal web on which the fixed end of the resilient blade is mounted.

4. A slide according to claim 1, in which the sliding of the moving rail backwards is limited by a back abutment position, the fixed rail being provided with first and second resilient blades, the first resilient blade being disposed so as to co-operate with the actuating finger when the moving rail is in its back abutment position so as then to cause the cam to pivot into its rest position, and the second resilient blade being disposed in front of the first resilient blade, in a position corresponding to a mean slide setting.

5. A vehicle seat comprising a seat back, a seat proper and at least one slide comprising:

a fixed first rail designed to be secured to the vehicle;

a moving second rail designed to support a seat proper, the moving rail being disposed parallel to the fixed rail and being mounted to slide along said fixed rail in a longitudinal forwards and backwards direction;

a latch mounted on the moving rail, the latch being displaceable between a first locked position in which it cooperates with the fixed rail to prevent the two rails from moving relative to each other, and a second unlocked position in which it no longer co-operates with the fixed rail and enables the moving rail to slide relative to the fixed rail;

a latch spring urging the latch toward its locked position;

means for displacing the latch from its locked position to its unlocked position;

a cam mounted to rotate on the moving rail between two stable angular positions, namely a first active position in which the cam acts on the latch to hold it in its unlocked position, and a second rest position in which the cam does not co-operate with the latch, the cam also having a neutral angular position between said two positions, and said cam further being secured to a rigid actuating finger;

means for displacing the cam from its rest position to its active position;

a cam spring urging the cam towards its active position when said cam is in an angular position between its neutral position and its active position, and urging the cam towards its rest position when said cam is in an angular position between its neutral position and its rest position; and at least one abutment member which is mounted on the fixed rail and which does not interfere with the actuating finger when the cam is in the rest position, the abutment member being suitable for co-operating with said actuating finger so as to retract out of the way of the actuating finger while the moving rail is being displaced forwards with the cam in the active position, and so as to constitute a fixed abutment relative to the actuating finger while the moving rail is being displaced backwards with the cam in the active position, the abutment member and the actuating finger being designed so that the actuating finger then causes the cam to pivot from its active position to beyond its neutral position, so that said cam is then returned to its rest position by the cam spring, thereby enabling the latch to return to its locked position under drive from the latch spring, the slide being designed so that, once the cam is placed in its active position, said cam remains in said active position so long as the actuating finger does not cause it to pivot;

wherein the abutment member is constituted by a resilient metal blade which extends substantially in said longitudinal direction between a first fixed end secured to the fixed rail and a second free end that can be displaced vertically, the resilient blade having a rising portion which extends sloping upwards and forwards starting from its fixed end, the actuating finger pressing against said rising portion so as to cause it to bend resiliently downwards while the moving rail is being displaced forwards with the cam in its active position, and the resilient blade further having a stop portion close to its free end, wherein the stop portion forms said fixed abutment for the actuating finger while the moving rail is being displaced backwards with the cam in its active position.

6. A vehicle seat according to claim 5, in which the means for displacing the cam from its rest position to its active position comprise a fastening point fixed to a cable that connects said cam to the seat back, the cable being mounted so as to displace the cam into its active position when the seat back is tilted down forwards.

* * * * *